No. 768,589. PATENTED AUG. 30, 1904.
I. W. COLBURN.
GLASS WORKING MACHINE.
APPLICATION FILED MAR. 3, 1903.
NO MODEL. 7 SHEETS—SHEET 1.

WITNESSES.
M. J. Dixon
W. R. Berry

INVENTOR:
Irving W. Colburn,
BY Henry H. Bates,
ATTORNEY.

No. 768,589. PATENTED AUG. 30, 1904.
I. W. COLBURN.
GLASS WORKING MACHINE.
APPLICATION FILED MAR. 3, 1903.
NO MODEL. 7 SHEETS—SHEET 3.

WITNESSES.
M. J. Dixon
W. R. Berry

INVENTOR:
Irving W. Colburn,
BY Henry H. Bates,
ATTORNEY.

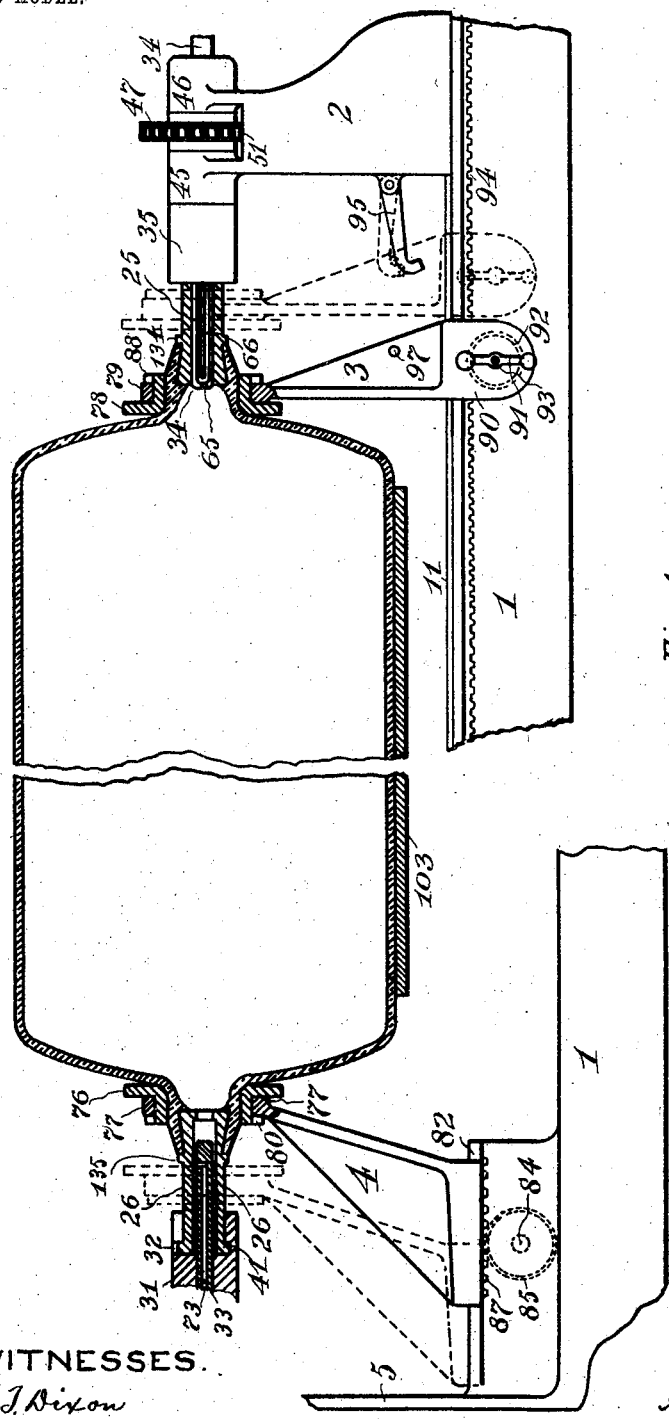

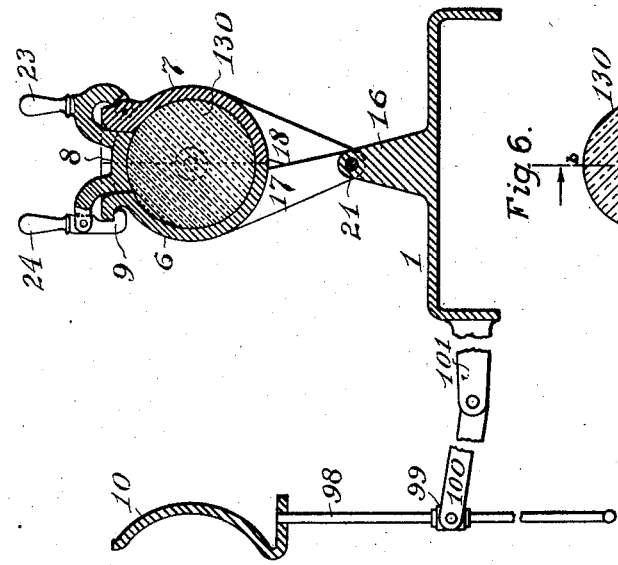

No. 768,589. PATENTED AUG. 30, 1904.
I. W. COLBURN.
GLASS WORKING MACHINE.
APPLICATION FILED MAR. 3, 1903.
NO MODEL. 7 SHEETS—SHEET 6.
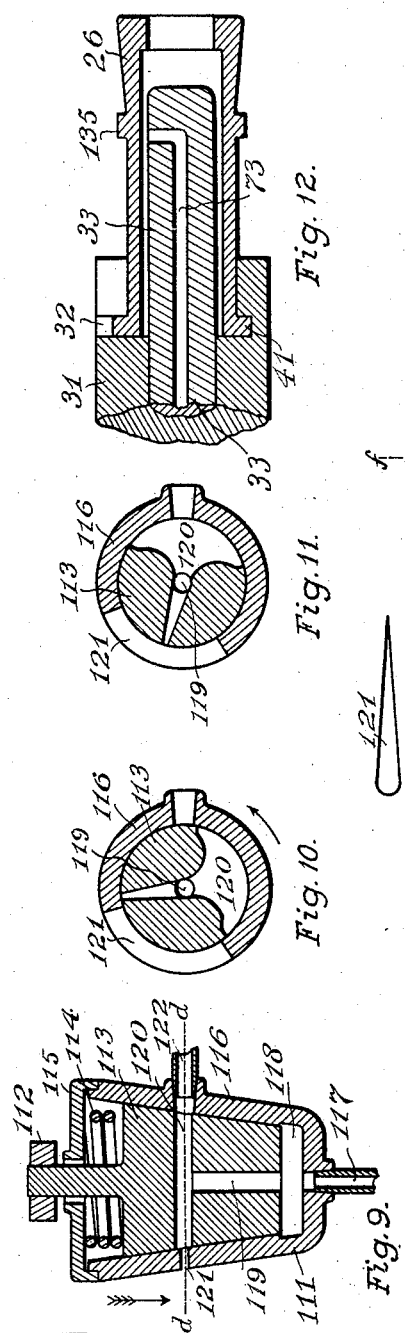
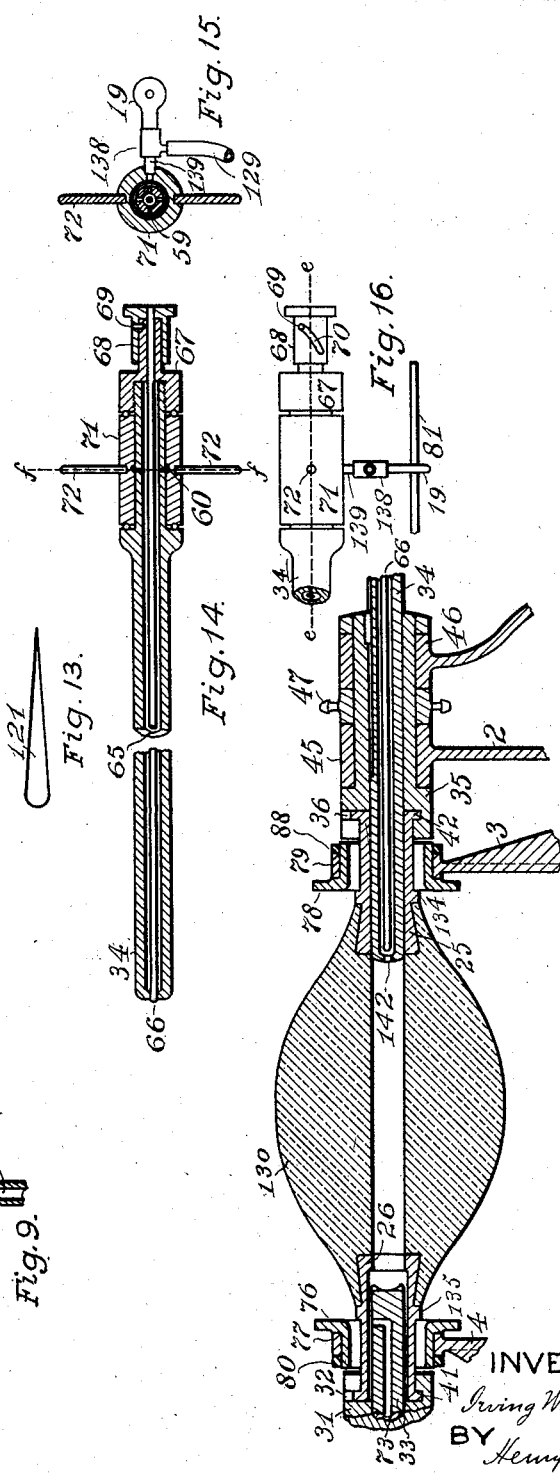
WITNESSES.
M. J. Dixon
W. R. Berry
INVENTOR:
Irving W. Colburn,
BY Henry H. Bates,
ATTORNEY.

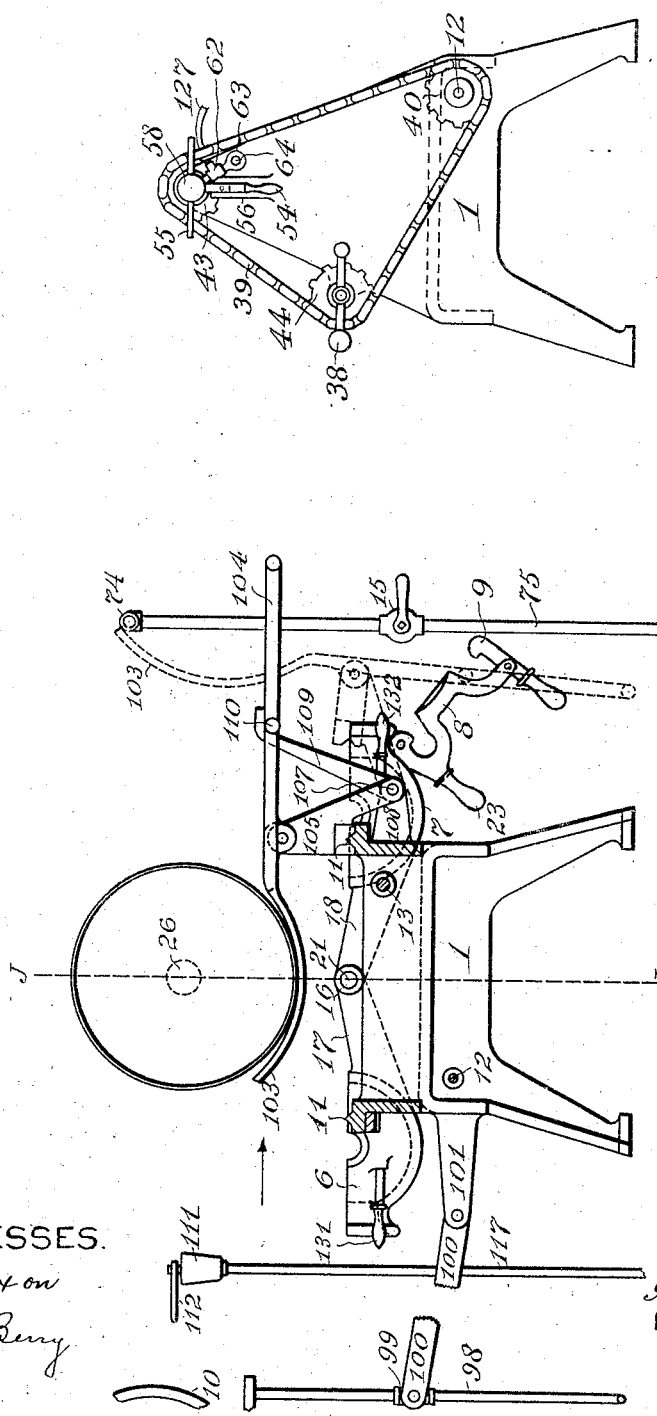

No. 768,589. Patented August 30, 1904.

UNITED STATES PATENT OFFICE.

IRVING W. COLBURN, OF FRANKLIN, PENNSYLVANIA.

GLASS-WORKING MACHINE.

SPECIFICATION forming part of Letters Patent No. 768,589, dated August 30, 1904.

Application filed March 3, 1903. Serial No. 145,879. (No model.)

*To all whom it may concern:*

Be it known that I, IRVING W. COLBURN, a citizen of the United States, residing at Franklin, in the county of Venango and State of Pennsylvania, have invented certain new and useful Improvements in Glass-Working Machines, of which the following is a specification.

My invention relates to a novel means or apparatus for producing articles of glass.

The object is to furnish a machine by the aid of which cylinders of large size can be made adapted to be cracked off at the ends where the cylinder terminates, slit open, and flattened out into sheets suitable for window-glass. The machine is also adapted for the formation of cylindrical and spheroidal vessels of large size by suitable manipulation.

Figure 1:
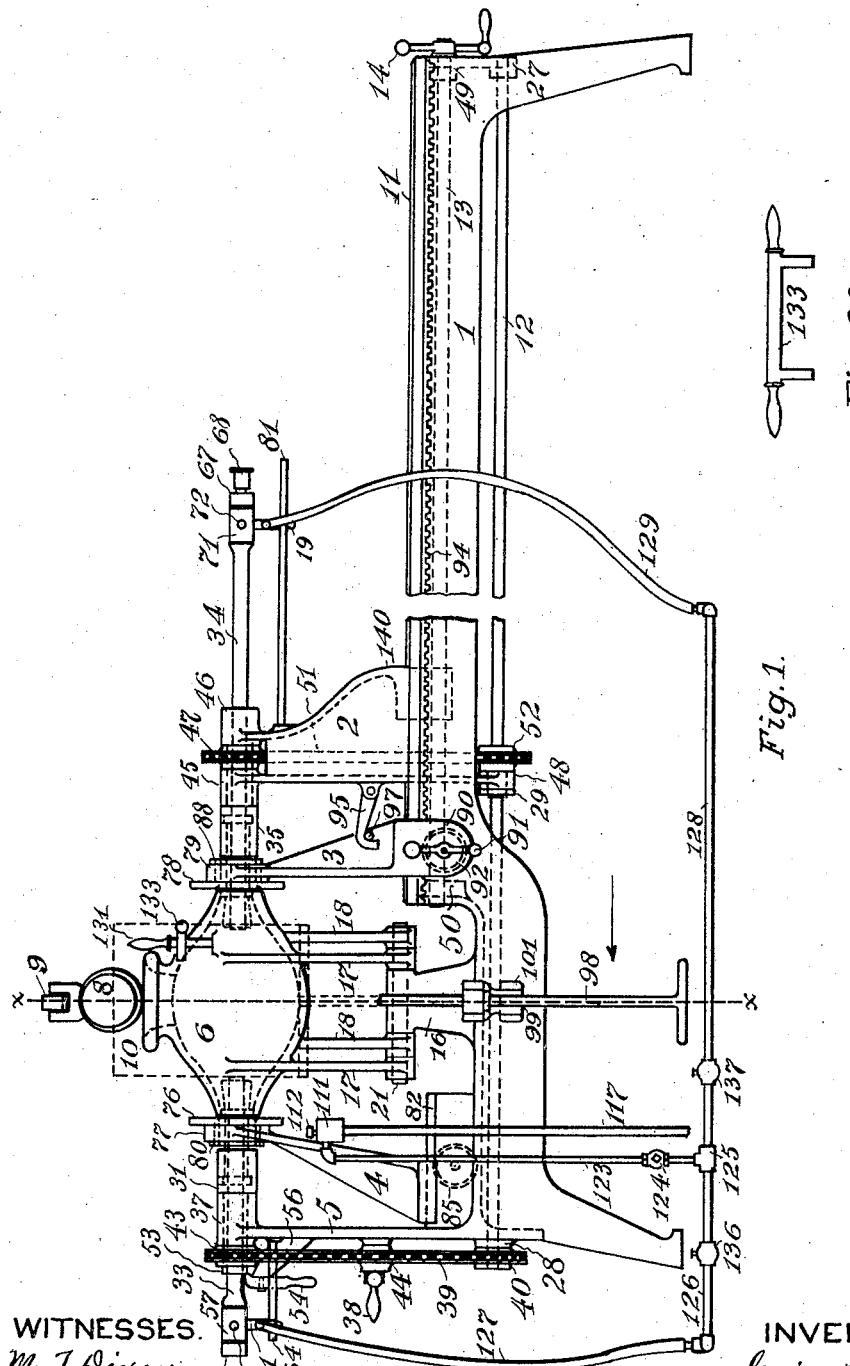
Figure 2:
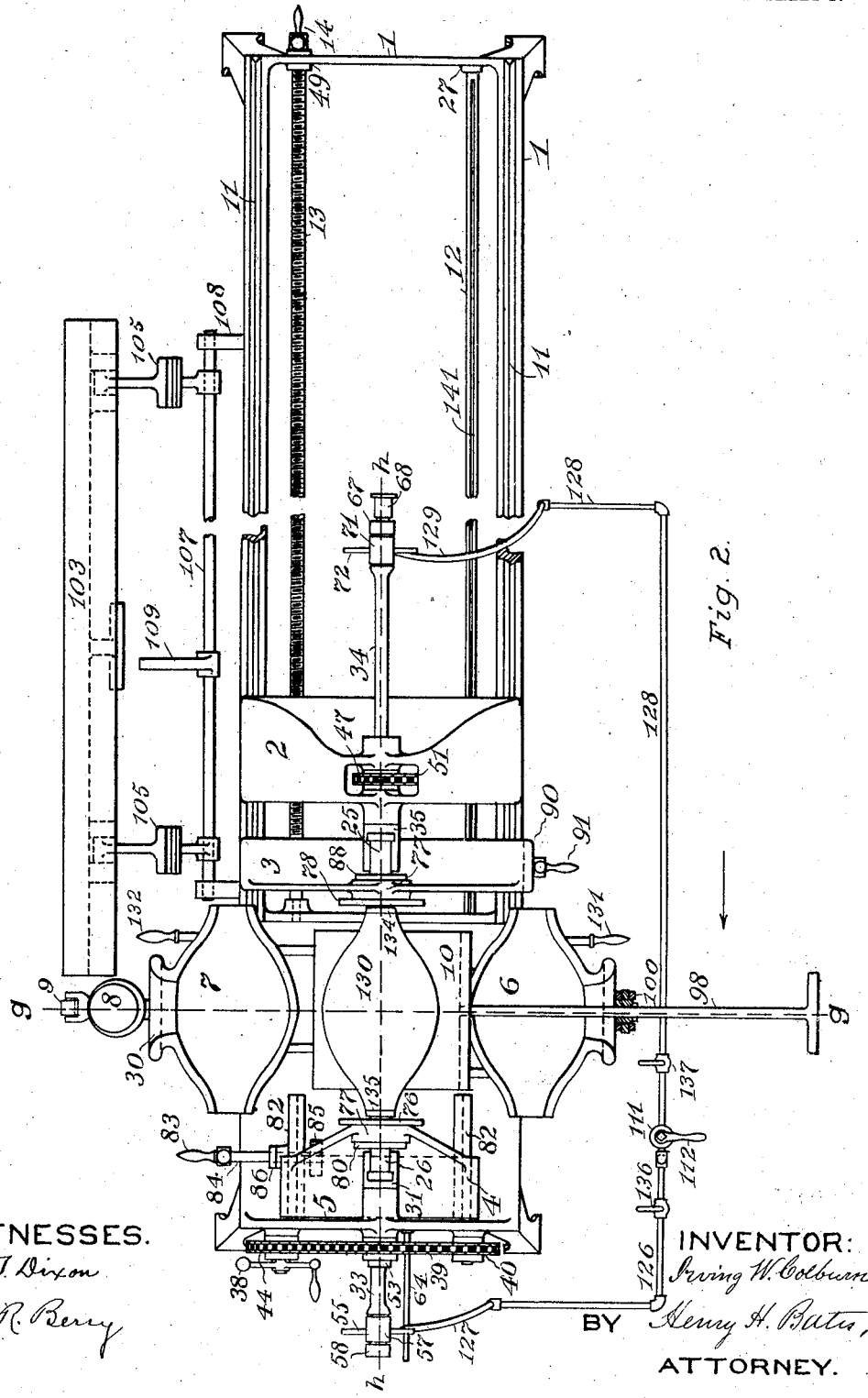
Figure 3:
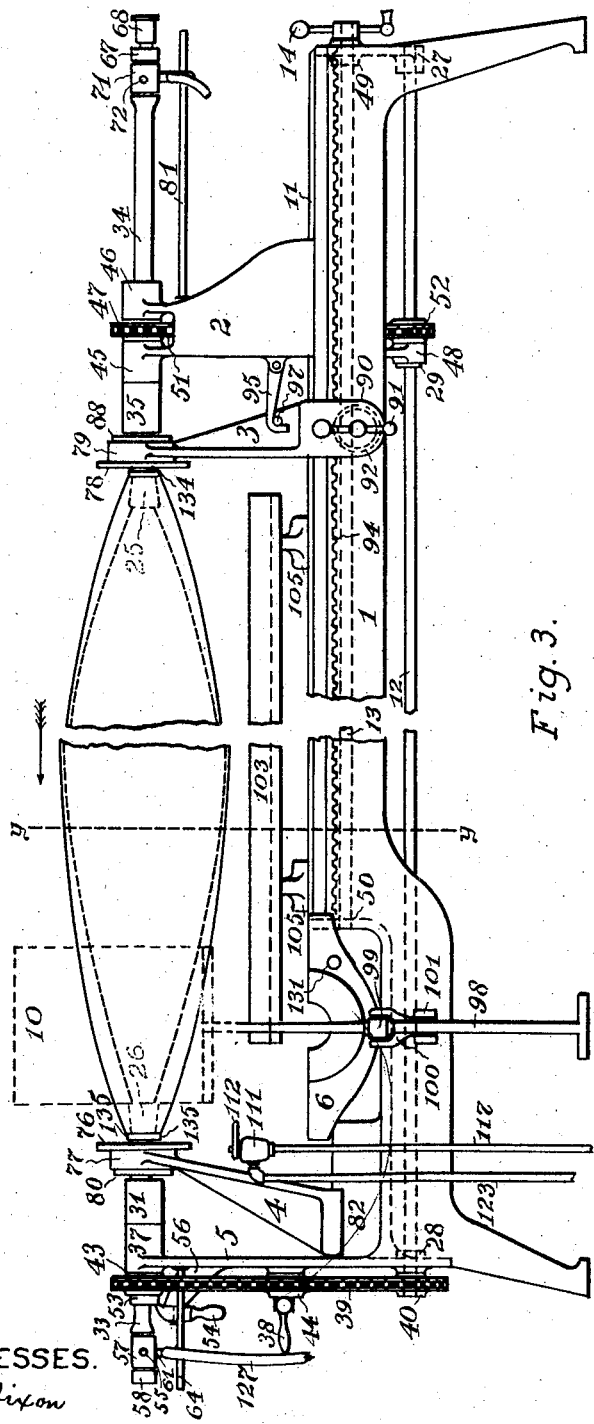

In the drawings forming a part of this specification, Figure 1 is a front elevation of the machine. Fig. 2 is a plan view. Fig. 3 is a front elevation at a certain stage of operation, showing the slicker 103 in place. Fig. 4 is a front elevation of a part of the machine at a certain stage of operation, partly in section, on line J J, Fig. 18, illustrating the neck-forming operation. Fig. 5 is a vertical section on line $x$ $x$, Fig. 1, showing mold closed with mouth open ready to receive a charge of molten glass. Fig. 6 is a sectional view on same line as Fig. 5, showing mold closed and filled and mouth closed and locked. Fig. 7 is a sectional view on line $g$ $g$, Fig. 2, showing mold open and modeling-marver 10 in place beneath the glass casting. Fig. 8 is a longitudinal sectional view through the glass casting and modeling-block on line $h$ $h$, Fig. 2. Fig. 9 illustrates the air-pressure-regulating valve in vertical section. Fig. 10 is a horizontal section of the air-pressure-regulating valve on line $d$ $d$ of Fig. 9, showing the valve closed. Fig. 11 is a horizontal section of the air-pressure-regulating valve on line $d$ $d$ of Fig. 9, showing the valve open. Fig. 12 is a vertical sectional view of the head-stock, holding-head, and movable plug and revoluble spindle, illustrating how the holding-head may be detached. Fig. 13 is a projection of the exhaust-port of the air-pressure-regulating valve developed on a plane. Fig. 14 is a sectional view of the tubular plunger. Fig. 15 is a transverse sectional view of the plunger on line $f$ $f$ of Fig. 14. Fig. 16 is a plan view of the outer end of the plunger. Fig. 17 is a longitudinal sectional view on line $h$ $h$, Fig. 2, illustrating the details of the holding-heads, neck-forming flanged washers, air-plug, and hollow plunger. Fig. 18 is an end view, partly in transverse section, on line $y$ $y$, Fig. 3. Fig. 19 is an end elevation showing sprocket and driving chain connecting rotary shafts. Fig. 20 illustrates the mold-clamp 133, Fig. 1.

Referring to the drawings, 1 is the frame of the machine, provided with ways 11, on which traverses the tail-stock 2. On said frame is mounted the screw 13 in bearings 49 50, having secured thereon the crank 14, by which it is operated. Said screw is in engagement with tail-stock 2 by means of a nut 140 integral therewith, which enables the tail-stock to be moved back and forth on the ways 11.

16 is a pedestal or upright bearing secured or integrally formed on frame 1, on which the members of the sectional mold are pivoted by means of arms 17 17 18 18 and shaft 21.

The mold is divided, preferably, into two members 6 and 7, pivotally opening and closing, as shown in Fig. 5, provided with handles 131 132, by which said members are operated. 133 is a clamp for retaining the members in secure position against pressure when closed. It embraces the handles 131 132 when in position. The mold may be of any suitable shape interiorly, the one shown being ellipsoidal, and has a mouth or aperture 30 when closed provided for filling purposes and a lid or cover 8, fitting the mouth 30 to close the aperture, pivotally secured to one of the mold members. Said lid is provided with a handle 23 and a locking-lever 24, the latter pivoted to the lid and engaging by a hook 9 with a projecting lug 22 on the opposite mold member to lock the aperture and secure the lid against displacement by internal pressure. The mold is preferably made of metal of highly-polished surface on the interior and is open at both ends when closed to admit the holding-heads, hereinafter described which project into the mold.

25 and 26 are the holding-heads, Figs. 2, 3, 4, 8, 17. They are tubular and roughened on their surfaces to cause them to adhere to the plastic glass.

31 35 are rotatory spindles to which said holding-heads 26 25 are detachably secured, respectively, by means of square lugs 41 42, inserted into the respective sockets 32 36 in the said spindles. Said spindles are in axial alinement and are revoluble in unison with their holding-heads by means hereinafter described. Spindle 31 is revolubly mounted in bearing 37 on a stationary headstock 5, affixed to the main frame of the machine. Spindle 35 is revolubly mounted in bearing 45 on movable tail-stock 2. On spindle 31 is secured sprocket 43, which is connected by chain-gearing 39 with sprockets 44 and 40. Sprocket 44 is an idler and receives motion by means of crank 38, secured to it, which motion is communicated to the other sprocket and thence to spindle 31 and shaft 12, on the latter of which sprocket 40 is mounted. Said shaft 12 is mounted on frame 1 in bearings 28 27, and on it by means of spline 141 is splined the longitudinally-movable sprocket 52, revolubly mounted on movable tail-stock 2 in bearing 48 and held in place by collar 29. In said tail-stock is also mounted on rotatory spindle 35 in bearings 45 46 the sprocket 47, connected with sprocket 52 by chain-gearing 51. These sprockets being in the same ratio of gear with sprocket 43 40, it follows that spindles 35 31 and their respective holding-heads rotate in unison, and they may be rotated in either direction at will by means of crank 38.

The hollow spindle 31 has splined within it, so as to rotate with it and be longitudinally movable therein, the plug 33, capable of being projected into the hollow holding-head 26 for the purpose of stopping the aperture in the end thereof. It also serves to convey air to the interior of the plastic casting by means of the passage 73. A collar 53 serves as a stop, engaged by a locking device 54, to hold the plug to its place. On the outer extremity of plug 33 is revolubly fitted the sleeve 57, held by cap 58 and provided with handles 55, by which the plug can be thrust into place or retracted. By means of this sleeve communication is established between the air-passage 73 and the air-conveying tube 127 through T-coupling 62 and nipple 61, Fig. 19, in a manner identical with that illustrated in Figs. 14 and 15 for sleeve 71 and hollow plunger 34, hereinafter described. A rod 64, projecting from head-stock 5, engages an eye 63 on said T-coupling and keeps sleeve 57 from rotating with the rotary plug 33, on which it is mounted. Holding-head 25, mounted in rotatory spindle 35, is also hollow and contains a tubular plunger 34, smooth and polished on its exterior and having a terminal aperture 142 smaller than the general bore 65 of the plunger. A movable rod 66 is located centrally within the plunger, the end of which fits said aperture 142 and stops it when in the position shown in Fig. 14. The outer extremity of the rod 66 passes through cap 67 on the end of the plunger and is fastened to movable end piece 68, sleeved into said cap-piece 67. Said end piece is diagonally slotted at 70, and into this slot projects a pin 69, secured on cap-piece 67, so that by a turning movement of end piece 68 the rod 66 is pushed into or drawn out of aperture 142 and at the same time locked in position. On plunger 34 is a revoluble sleeve 71, held in place by screw-cap 67, channeled at 60 opposite the perforations 59 in the rotatory plunger for the admission of air thereto, Figs. 14, 15. The air under pressure comes to sleeve 71 through nipple 139 and T-coupling 138 from a source of compressed air through flexible tube 129. A rod 81, affixed to tail-stock 2, passes through eye 19 on the T-coupling, and thereby prevents the sleeve 71 from rotating with the plunger, while permitting longitudinal movement. Handles 72 are provided on the sleeve, by which the plunger 34 can be moved lengthwise independently of the rotatory spindle 35 and holding-head 25.

Mounted on movable support 4, traversing on ways 82 and in bearings 77, is the neck-drawing flanged washer 76, with functions to be hereinafter described. It is made, preferably, of metal polished on its inner face, is free to rotate in its bearing, and is held in place by collar 80. Said movable support 4 is traversed on ways 82 by means of a gear-wheel 85, Fig. 5, intermeshing with a rack 87, formed on the under side of support 4 and operated by crank 83 on shaft 84, affixed to said gear-wheel and borne by a bearing in ways 82. On the side opposite is a corresponding movable support 3, traversing on ways 11 by means of a gear-wheel 92, intermeshing with rack 94, supported on shaft 93, borne in apron 90 on movable support 3 and actuated by crank 91 on said shaft. Said movable support carries in bearings 79 the rotatory flanged neck-drawing washer 78, similar in construction and function to flanged washer 76 and held in place in its bearings by collar 88. These neck-drawing washers can be traversed back and forth at will by the means described. On support 3 is a pin 97, formed for engagement by a hook 95, pivoted on tail-stock 2, so that movable support 3 may travel backward with the tail-stock when said hook and pin are in engagement. The purpose of the neck-drawing flanged washers is to form a neck of glass on each end of the glass article extending between the holding-heads and the article proper at which the latter can be cracked off and released from the holding-heads and removed from the machine.

10 is a marvering-tool for smoothing, shaping, and modeling the plastic article in process of formation. It has a handle 98 passing freely through and turning in a trunnion-block 99, the latter pivoted in the fork of connecting-piece 100, which is itself pivoted to a bracket-arm 101, fixed on frame 1, thus permitting a triple movement to the marver—namely, a back-and-forth motion, an up-and-down motion, and a turning motion. On the opposite side of frame 1 is a slicker 103, made of any suitable material, attached to handle 104, the latter pivoted to guide-blocks 105, which are movably carried on a longitudinal shaft 107, affixed to the main frame by brackets 108. The blocks 105 are also provided with V-shaped grooves, by which they rest on and are traversable on the ways 11. There is a hook 109, also pivoted on shaft 107, so placed as to engage with a pin 110 on handle 104 and keep the slicker 103 from falling down when in position Fig. 18. The slicker can be manipulated by handle 104 and run back and forth on ways 11 and shaft 107 with any required degree of pressure on the plastic article.

I will now describe the air supplying and regulating apparatus.

111, Figs. 1, 2, and 9, is an air-regulating valve so constructed as to control both the air-pressure and the air volume admitted to the article under formation by a single movement. It is mounted on a supply-pipe 117, leading from a source of air under compression, and consists of a turn-plug 113 in a conical casing 116, held in seat by a spring 114 and cap 115 and manipulated by handle 112. The air reaches chamber 118 and passes thence to port 119 and port 120. In the latter port it divides, one portion passing through port 121 to the atmosphere and the other portion passing by nipple 122 to the pipe 123, Fig. 1. The port 121 is made of tapering aperture, as displayed on a plane in Fig. 13, so that as the plug 116 is moved in the direction of the arrow on Fig. 10 at first the maximum of discharge to the external air occurs and the pressure beyond nipple 122 is at minimum. As the plug continues to turn the aperture 121 contracts and more pressure is utilized until finally the entire volume of discharge is sent at maximum pressure through the nipple 122. From said nipple the air-current passes by pipe 123 through check-valve 124 to T-coupling 125, where the stream divides, one portion going by pipe 126 and flexible tube 127 to air-plug 33 for delivery through holding-head 26 and the other portion going by pipe 128 and flexible tube 129 to air-passage 65 in plunger 34 and thence through holding-head 25 to the interior of the plastic article under formation. The air thus finds access to the casting under treatment from both sides at once, or either side alone, or neither at will, accordingly as cut-off valves 136 and 137 in pipes 126 and 128 are manipulated.

124 is a check-valve to hold the air in the plastic article as delivered. A water-supply pipe 75 is also provided, controlled by valve 15 and terminating in perforated sprinkler 74 for the purpose of keeping the slicker wet and cool between operations.

Operation: Taking the machine at rest, with the parts in the position shown in Fig. 1, the mold members having been previously heated to the proper temperature, so as not to chill the plastic charge on the one hand or be liable to adhere to it on the other, the clamp 133 is placed in position for the purpose of holding the mold securely closed in spite of internal pressure. The holding-heads project within the mold at each end, plug 33 being in position to stop the aperture in holding-head 26 and securely locked. The plunger 34 is in retracted position within the mouth of holding-head 25 with its terminal aperture closed by rod 66, as in Fig. 14. The filling-aperture is open and the mold-lid is thrown back, as in Figs. 1 and 5. Air-regulating valve 111 is closed against the passage of air. The supports 3 and 4 of the neck-drawing apparatus are drawn back in the position shown in Figs. 1 and 2 and hook 95 is closed over pin 97. Marver 10 is in the position shown in Fig. 6. The slicker 103 is in the position shown in dotted lines in Fig. 18. Molten glass is now brought to the machine by any of the appliances usually employed for handling melted glass in glassworks, and a sufficient charge is poured into the mold through aperture 30. The molten charge adheres to the roughened surfaces of the holding-heads, but not to the polished interior of the mold. The lid 8 is now closed upon the plastic charge, as in Fig. 6, and locked. Screw 13 is now put in rotation by means of crank 14 in a direction to advance tail-stock 2 and holding-head 25 toward the mold, which tends to force holding-head 25 into the plastic glass, and thus powerfully compresses the semifluid charge, the pressure being distributed throughout the mass, so as to bring the same into intimate contact with all parts of the inner surface of the mold, causing it to take the exact form thereof and to adhere still more closely to the roughened holding-heads. The collars 134 and 135 on the holding-heads, which fit the open ends of the mold, prevent the plastic glass from flowing out under pressure and form stops by which to exert and hold the pressure applied. As soon as the plastic charge is sufficiently set the mold-cover is unlocked and lifted, the clamp is removed, and the mold members are opened, taking the position shown in Fig. 7. The holding-heads are now started into rotation by means of crank 38, carrying the plastic mass with them. The marvering-tool 10 for smoothing, shaping, and marvering the rotating glass may now be brought into operation, having been previously brought to a suitable temperature for the purpose and been suitably treated, and for properly marvering the glass at this stage the rotary motion may be retarded, accelerated, or reversed in direction, as the work may seem to require. At the proper time during the marvering operation or just after its completion the polished plunger 34 is advanced into and through the plastic mass, completely penetrating the same axially and pushing plug 33, which is now unlocked, backward out of its position, closing the aperture of holding-head 26 to the position shown in Fig. 17. Plunger 34 is now withdrawn to the position shown in Fig. 17, rod 66 is withdrawn from aperture 142 in plunger 34, and thus two air-passages to the interior of the plastic mass are provided by the opening of valves 136 and 137. Air is now admitted to the plastic charge by manipulating air-regulating valve 111 at any required degree of pressure, and it can be admitted at either end or both ends in any desired quantity by proper management of said valves 136 and 137. After the marvering operation has been sufficiently conducted the block 10 is removed out of the way to its former position. The regulated expansive force of the admitted air gradually brings the rotating mass to the desired size and shape, and the tail-stock 2 is moved back during the operation to draw and stretch the forming article until it assumes shape somewhat as shown in Fig. 3. At a suitable time during these operations the neck-drawing appliances can be brought into play by unhooking hook 95 and advancing flanged washer 78 to the position shown in Fig. 4 by means of crank 90 and by advancing flanged washer 76 to the position shown in Fig. 4 by means of crank 83. A neck is thus formed on each end of the rotating plastic mass surrounding the end of each holding-head, extending a suitable distance between the latter and the finished article. These necks aid in the removal of the completed article from the holding-heads by affording a narrow place where they can be readily cracked off. Before the forming operation is completed the slicker 103 is brought into action, having been previously kept cool and moist by the means for water-sprinkling shown in Fig. 18 and suitably prepared by a treatment with paste or other appropriate means of lubrication adapted to the conditions, so as not to scratch, mar, or otherwise injure the delicate surface of the glass under manipulation. It is brought into the position shown in Fig. 18 and is kept moving back and forth lengthwise of the machine with any desired degree of pressure continuously during the rest of the blowing operation until the glass object reaches the desired size. The manipulation by the slicker usefully regulates the diameter of the glass cylinder and also determines its thickness and form, enabling the diametral enlargement to be stopped at any point.

I claim and desire to secure by Letters Patent—

1. A mold having open ends, and a filling-aperture, means for closing said ends and filling-aperture, means for locking said mold and aperture when the mold is charged with plastic glass, and means for applying endwise pressure to the charge in the mold when filled.

2. A divided mold having open ends, means for opening, closing and locking the mold, a filling-aperture for the mold, a separate means for closing and locking said aperture, means for closing said ends, and means for exerting endwise pressure upon the plastic charge in the mold.

3. A divided mold open at the ends, two holding-heads in axial alinement projecting into said mold at the open ends, means for charging said mold with molten or plastic glass, means for closing and locking said mold against internal pressure, and means for exerting pressure on the glass contents of the mold, to compact the glass upon and around the said holding-heads.

4. A divided mold, consisting of vertically-swinging pivoted members, with means for opening, closing and locking the mold, apertures in the ends of the mold when closed, a filling-aperture in the mold when closed, and a lid or cover, hinged to one member, and engaging the other member by a locking device.

5. A mold with open ends, holding-heads for plastic glass projecting into said open ends, collars on said holding-heads, closing the end apertures of the mold when the said heads are in place, thereby preventing the escape of plastic glass around the holding-heads, and means for applying endwise pressure upon the contents of the mold through said holding-heads and collars.

6. A divided mold having open ends and a filling-aperture, two rotatory holding-heads for plastic glass in axial alinement projecting into said open ends, collars on said holding-heads fitting and closing said open ends, means for closing and locking said mold and aperture when the mold is charged with plastic glass, and means for approximating said holding-heads upon the plastic charge, whereby the latter is caused to closely fill the mold and fit itself adhesively and securely upon and around the holding-heads.

7. Two rotatory holding-heads for plastic glass in axial alinement, means for casting a mass of plastic glass between and in secure adhesion to said holding-heads, whereby said glass may be rotated, a blocking device, for marvering the rotating mass of glass, means for rotating said glass and holding-heads, and jointed connections securing said blocking device to the machine while admitting of the various movements required in blocking in coöperation with the rotating mass.

8. Two tubular rotatory holding-heads for plastic glass in axial alinement, means for casting a mass of plastic glass between and in secure adhesion to said holding-heads, whereby said glass may be rotated, and a plunger in axial alinement with the rotatory mass of glass, constructed and adapted to be thrust centrally through said rotatory mass, and into the opposite holding-head.

9. Two rotatory holding-heads for plastic glass in axial alinement, means for casting a mass of plastic glass between and in secure adhesion to said holding-heads, whereby said glass may be rotated, and means for rotating said holding-heads in unison in either direction and in each direction.

10. Two tubular rotatory holding-heads for plastic glass in axial alinement, means for casting a mass of plastic glass between and in secure adhesion to said holding-heads, whereby said glass may be rotated, means for introducing compressed air at regulated pressure to the interior of said rotatory mass of glass through said holding-heads, and independent cut-off valves in the air-passages whereby the air-current may be shut off from either holding-head separately.

11. Two tubular rotatory holding-heads for plastic glass in axial alinement, means for casting a mass of plastic glass between and in secure adhesion to said holding-heads, whereby said glass may be rotated, means for introducing compressed air at regulated pressure to the interior of said rotatory mass of glass through said holding-heads, annular flanged washers surrounding said holding-heads at a suitable distance, for forming necks on the ends of the glass article in process of formation, and means for advancing said washers over the ends of said holding-heads as the glass rotates, to form the necks, for the purpose described.

12. A means for casting a mass of plastic glass rotatively held at both ends, means for rotating said plastic mass, means for introducing compressed air within the plastic mass while rotating, at either end at will, an air-pressure-regulating valve for controlling the degree of pressure of the admitted air, and a hand-lever for manipulating said air-regulating valve at the will of the operator.

13. Two rotatory spindles horizontally placed in axial alinement, holding-heads for plastic glass detachably held in said spindles, means for casting a mass of plastic glass between and around said holding-heads, means for rotating in unison said spindles and holding-heads, and forming means for molding and drawing a narrow neck on the casting beyond the holding-heads, where the glass article may be cracked off and detached from said holding-heads.

14. Two rotatory hollow holding-heads for plastic glass in axial alinement, means for casting a mass of plastic glass between and around said holding-heads, a tubular movable plug in one of said holding-heads for stopping the terminal aperture thereof, a lock for holding said plug to its seat in said holding-head, and means for passing air under regulated pressure through said tubular plug and holding-head when the plug is retracted.

15. Two rotary holding-heads for plastic glass in axial alinement, means for casting a mass of plastic glass between and around said holding-heads, a hollow movable plunger in one of said holding-heads, means for moving said plunger lengthwise through said holding-head and intervening glass into the opposite holding-head, means for stopping and unstopping the terminal aperture of said plunger at will from the outside of the plunger, and means for passing air under regulated pressure through said plunger.

16. A main frame, a fixed head-stock on said frame, a movable tail-stock on said frame, tubular rotatory spindles held in bearings on said head-stock and tail-stock respectively, in axial alinement, tubular holding-heads for plastic glass detachably held in said spindles, means for rotating said spindles and holding-heads simultaneously in unison in either direction, means for passing air under regulated pressure through said holding-heads while in rotation, an open-ended mold between said holding-heads, the open ends of which are closed by said holding-heads, and means for moving said tail-stock away from said head-stock while said holding-heads are in simultaneous rotation.

17. A main frame, a fixed head-stock on said frame, a movable tail-stock on said frame, rotatory holding-heads for plastic glass held in axial alinement on said head-stock and tail-stock respectively, flanged neck-washers surrounding said holding-heads near the extremities thereof, with an intervening annular space, movable pedestals with bearings supporting said neck-forming washers, means for moving said pedestals lengthwise of the frame, and means for locking one of said pedestals to the movable tail-stock at will.

18. Two tubular rotatory holding-heads for plastic glass in axial alinement, means for moving one of said holding-heads toward and from the other holding-head in axial alinement, means for passing compressed air to and through said holding-heads independently, means for cutting off the air-current from either of said holding-heads at will, a hand-operated valve for regulating the pressure of the air-current, and a check-valve between said regulating-valve and the holding-heads, for holding the air against back pressure.

19. A main frame, a fixed head-stock on said frame, a tail-stock movable lengthwise on said frame, a screw-shaft mounted lengthwise on said frame, a nut on said movable tail-stock in engagement with said screw, a means for operating said screw-shaft, a splined shaft mounted lengthwise on said frame, a means for rotating said shaft, rotatory spindles mounted in axial alinement on said head-stock and tail-stock respectively, holding-heads for plastic glass detachably held in said spindles, in axial alinement, sprocket-gears on said spindles for rotating the same, sprocket-gears on said splined shaft, one fixed and the other movably splined thereon, and chain connections between said spindle-sprockets and the respective fixed and movable sprockets on the shaft, whereby said spindles are rotated in unison when the shaft is rotated in either direction.

20. A main frame, a pedestal on said frame, a divided mold having its members pivoted by arms to said pedestal, means for opening, closing and locking said mold, the opposite ends of said mold being open when closed, rotatory holding-heads for plastic glass in axial alinement, projecting within said open ends, collars on said holding-heads fitting within and accurately closing the open ends of said mold, a filling-aperture for said mold, a pivoted locking-lid for said aperture, and means for exerting pressure upon the glass within the mold after the latter is filled and locked, whereby the glass is compressed and compacted about the ends of the holding-heads, and caused to fill every portion of space in the mold.

21. Two tubular rotatory holding-heads for plastic glass in axial alinement, one longitudinally fixed and the other movable, a hollow plunger within the movable holding-head, means for rotating said movable holding-head and plunger, means for moving said plunger lengthwise within the holding-head independently of the latter, a sleeve revolubly held on the outer extremity of the plunger, means for holding the sleeve against rotation while the plunger rotates, a flexible conduit for air under pressure connected with said sleeve, and air-passages in said sleeve and plunger in communication, whereby compressed air may be sent through the plunger while rotating and when in longitudinal movement.

22. Two tubular rotary holding-heads for plastic glass in axial alinement, one longitudinally fixed and the other longitudinally movable, a hollow plug within the fixed holding-head, means for rotating said fixed holding-head and plug, means for moving said plug longitudinally within the holding-head to stop and unstop the aperture thereof, a sleeve revolubly held near the outer extremity of the plug, means for holding the sleeve against rotation while the plug revolves, a flexible conduit for air under pressure connected with said sleeve, and communication between said sleeve and plug, whereby compressed air is sent through the plug and holding-head while rotating, when the plug is in the retracted position.

23. Two tubular rotary holding-heads for plastic glass in axial alinement, one longitudinally fixed and the other longitudinally movable, a hollow plunger within the movable holding-head, means for rotating said fixed hollow holding-head and plunger, means for moving said plunger lengthwise within the holding-head independently of the latter, said plunger having a terminal aperture smaller than the bore of the plunger, a rod within the plunger, movable lengthwise therein independently of the plunger and holding-head, an end piece secured on the outer end of the said rod by which the rod can be manipulated to stop or unstop the terminal aperture of the plunger, and a locking slot and pin, whereby the end piece and rod are held securely in either the stopped or the unstopped position.

24. A means for casting a mass of plastic glass rotatively held at both ends, means for rotating said plastic mass, means for expanding said mass by internal pressure while rotating, and a slicker, provided with means for securing longitudinal to-and-fro movement over the surface of the rotating mass at graduated pressure applied by the hand of the operator.

25. A main frame, longitudinal ways thereon, a longitudinal shaft parallel with said ways, guide-blocks traversing on said shaft and ways, a slicker pivoted on said guide-blocks, and a handle by which said slicker may be manipulated and pressure applied to the rotating glass article in process of formation.

26. A means for casting a mass of plastic glass rotatively held at both ends, means for rotating said plastic mass, means for expanding said plastic mass while rotating, a slicker, having a surface which is a segment of a cylinder, mounted beneath said rotating mass, means for traversing said slicker longitudinally to and fro beneath said rotating mass, and means for applying manual pressure to said slicker to force it against the rotating mass.

27. The combination of ways 11, shaft 107, guide-blocks 105, pivoted slicker 103, and means whereby said slicker may be longitudinally moved to and fro, and pressure applied to the object under treatment.

28. Two tubular rotatory holding-heads for plastic glass in axial alinement, one fixed and the other longitudinally movable, means for casting a mass of plastic glass between and around said holding-heads, means for rotating said holding-heads and glass in unison, a hollow movable rotatory plunger in said movable holding-head, terminally apertured, means for moving said plunger lengthwise through its holding-head into and through the mass of plastic glass, into the opposite holding-head, means for stopping and unstopping the terminal aperture of said plunger, means for passing air under regulated pressure through said plunger, a tubular movable rotatory plug in said fixed holding-head for stopping the terminal aperture thereof, means for moving said rotatory plug lengthwise in said holding-head independently of its rotation, and means for passing air under regulated pressure through said plug, and fixed holding-head, into the perforated mass of plastic glass.

29. Two tubular rotatory holding-heads for plastic glass, in axial alinement, means for casting a mass of plastic glass between and in secure adhesion to said holding-heads, means for rotating said holding-heads and plastic glass in unison in either direction, means for conveying compressed air to the interior of said rotatory plastic mass through said holding-heads, and a hand-regulated valve, for controlling the pressure of the air supplied to the glass, consisting of a casing, a conical spring-pressed plug in said casing, an air-inlet in said casing, two air-outlets in said casing, one leading to the open air to control pressure, and the other leading through pipes to the rotatory mass of glass, a branched passage through said valve-plug leading by its branches respectively to said outlets, said open-air outlet being tapered to form a variable passage as the plug is turned, and a hand-lever for operating the plug, by differential of pressure between the open-air outlet of the valve and the glass-blowing outlet thereof the air-pressure within the expanding glass is regulated at will, substantially as specified.

In testimony whereof I have signed my name to this specification in presence of two witnesses.

IRVING W. COLBURN.

Witnesses:
   FRED. D. OILER,
   ROBT. F. GLENN.